Patented June 20, 1939

2,163,085

UNITED STATES PATENT OFFICE 2,163,085

FLAMEPROOFED CELLULOSIC MATERIALS

Martin Eli Cupery, Wilmington, Del., assignor to E. I. du Pont de Nemours & Company, Wilmington, Del., a corporation of Delaware No Drawing. Application September 15, 1938, Serial No. 230,147

14 Claims. (Cl. 91—68)

This invention relates to compositions of matter containing a combustible organic material and fire-retardants.

This invention has as an object the provision of fire-retardants for non-volatile readily combustible organic materials, as a further object the provision of fire-retardants for textiles and cellulosic materials, and as a still further object the provision of combined softeners and fire-retardants for such materials as paper and regenerated cellulose film. Other objects will appear hereinafter.

These objects are accomplished by the following invention which comprises compositions containing an organic combustible substance, such as paper, regenerated cellulose film and the like, and, as a fire-retardant therefor, the reaction product of phosphoric anhydride with excess anhydrous liquid ammonia, and methods set forth in further detail below for preparing these compositions.

The fire-retardant material of this invention is essentially prepared by adding phosphoric anhydride ($P_2O_5$) to an excess of anhydrous liquid ammonia, allowing the excess ammonia to evaporate and then dissolving the product in a sufficient amount of water to give the desired concentration. If the final solution has an acid reaction, additional ammonia is added to give a neutral solution. Various materials such as paper, textiles, wood, leather, or regenerated cellulose in sheet or filament form, may be impregnated by dipping them into the solution of the fire retardant and then drying the same. Such treated products are resistant to fire and in most cases are highly flameproof when from 10 to 15% by weight of fire retardant is impregnated into the treated article. Regenerated cellulose film thus impregnated remains transparent and will not propagate a flame when ignited.

The more detailed practice of the invention is illustrated by the following examples, wherein parts given are by weight. There are of course many forms of the invention other than these specific embodiments.

Example I

About 50 parts of phosphoric anhydrides are slowly added, with stirring and minimum exposure to air, to 400 parts of anhydrous liquid ammonia, the reaction vessel being cooled by means of a solid carbon dioxide-acetone mixture. When all has reacted, the excess ammonia is allowed to evaporate, leaving a sticky, gum-like mass of product. The product is weighed, and sufficient cold water is added to give a solution comprising 85% water and 15% of product. This solution has a faintly alkaline reaction to litmus.

A white cotton voile fabric of 68–76 count and weighing about 1.5 oz. per square yard is dipped into the above mentioned solution and then squeezed between rollers to twice the dry weight of the fabric. Upon drying the cloth retains 15% by weight of the fire-retardant based on the original weight of the cloth. The dry cloth does not propagate a flame and burns only at the actual point of contact with the flame. After exposure to atmospheric conditions for several months the cloth shows no appreciable discoloration or deterioration. The product shows practically no crystallization within the treated fabric at effective concentrations and in this respect is greatly superior to ordinary fire retardant salts such as ammonium phosphate, which readily crystallize at equivalent concentrations and thereby impart harshness or stiffness to the fabric.

Other textile fabrics, including heavy cotton duck, cotton muslin, viscose rayon, silk, linen or wool, may be similarly treated and similar results obtained.

Example II

Regenerated cellulose sheeting in the gel form is immersed for one minute in a solution containing 4.5% of fire retardant prepared as described in Example I, then removed and dried on a frame at 100° C. for 10 minutes. After cooling and conditioning in air the cellulose sheet is flexible, clear and transparent, and is highly flame-resistant in that it does not propagate a flame when ignited. Such treated film shows no appreciable deterioration, discoloration, or crystallization of the product within the film upon storage for several months.

Sheets of transparent regenerated cellulose similarly treated with diammonium phosphate and dried show exceedingly bad crystallization of the salt within the film so that the product is no longer transparent.

Example III

Regenerated cellulose sheeting in the gel form is immersed for one minute in a 5% solution of the fire-retardant prepared as described in Example I, then placed on a frame and dried at 100° C. for 10 minutes. The cellulose sheet after being conditioned at 25° C. and 50% relative humidity for 24 hours is flexible, clear and transparent and shows excellent fire retardant properties. Strips of the treated product held in vertical position do not propagate a flame when brought into contact with a flame.

The fire-retardant also has a softening action on the cellulose sheet as is illustrated by the results given in the following table:

| Treatment | Elongation at break | Tensile strength at break |
|---|---|---|
| | Percent | Lbs./sq. in. |
| None | 5 | 15,350 |
| Treated as above example | 7 | 12,800 |

Sheets of regenerated cellulose identical in source and preparation and of equal thickness are used in each of the above measurements. The control sheet is immersed in plain water, dried at 100° C. for 10 minutes and conditioned at 25° C. and 50% relative humidity for 24 hours. The measurements are made on the standard Scott machine. The higher elongation and lower tensile strength at break in the case of the treated film, indicates that the phosphoric anhydride-ammonia product exerts a plasticizing action. Similar effects in the case of paper and textiles can be recognized by one skilled in the art.

*Example IV*

Samples of medium weight crepe paper are dipped into a 10% solution of the fire retardant prepared as described in Example I, pressed to remove excess solution, and then dried at about 100° C. The treated paper contains approximately 15% of the first retardant but shows no appreciable stiffening or increased harshness. When brought into contact with a flame, the treated paper is charred only at the point of contact with the flame and shows no tendency to propagate the flame or to burn when the flame is removed.

Other grades of paper, including soft tissue paper, hard finished paper or heavy building paper, when similarly treated, give similar results.

The fire retardant of the present invention is obtained by reacting phosphoric anhydride and excess ammonia. The reaction for preparing this fire retardant is preferably carried out by adding phosphoric anhydride ($P_2O_5$) under anhydrous conditions with suitable stirring and cooling to anhydrous liquid ammonia. The solid mass which forms in the excess ammonia is separated and dissolved in water. It is thought that the primary reaction product isolated from the liquid ammonia, which is believed to be a phosphamide, may react further with water when it is dissolved since additional ammonia is sometimes required to obtain solutions which are not acidic in reaction to litmus. The above reactions may in part be illustrated by equations such as the following:

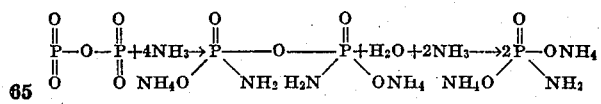

An alternative method of reacting ammonia with phosphorus pentoxide comprises passing gaseous anhydrous ammonia into a tube or vessel containing dry phosphorus pentoxide, with or without the presence of an inert, anhydrous liquid, and suitably mixing the reaction mixture by stirring or by rotation of the reaction vessel as the reaction takes place. Cooling is also desirable to control the exothermic reaction temperature. However, following the initial reaction, the product may in some cases be heated with excess ammonia at superatmospheric pressure to complete the reaction with ammonia. Water or moisture vapor must be excluded until the primary reaction has been completed in order to prevent the formation of ordinary ammonium phosphate. The presence of a small amount of ammonium phosphate in the reaction product does not, however, mask the advantageous effects obtained from the use of the product as a fire retardant; for example, the presence of a small amount of ammonium phosphate can be tolerated when the product is used as a fire retardant in transparent regenerated cellulose sheet or film. No crystallization of the product within the transparent cellulose film takes place at 50% relative humidity when as much as about 5% of diammonium phosphate is present in the reaction product.

The phosphoric anhydride-ammonia reaction product may in certain cases be used in combination with other ordinary fire retardants such as ammonium sulfate, ammonium chloride, bromide or fluoride, ammonium carbonate, sodium borate, boric acid, ammonium phosphate, and the like. Such combinations show less tendency to crystallization within the article treated, or on its surfaces, when ordinary fire retardants are used entirely.

The concentration of $P_2O_5$—$NH_3$ reaction product necessary will vary with the degree of fire retardance required and the relative combustibility of the material to which applied. In general from 5 to 15% by weight based on the original weight of the material treated is adequate to give products which will not propagate a flame, and which ignite with difficulty at the point of contact with the igniting flame. Lower and higher amounts may be used. Lower amounts, while not as effective, nevertheless do have an appreciable effect in decreasing the combustibility. The solutions may be applied by spraying, by painting, or by immersion of the article in the solution.

The $P_2O_5$—$NH_3$ fire retardant is generically applicable to retard combustion of any combustible, non-volatile organic material. However, the product finds its widest application with greatest advantages when used with cellulosic materials such as textiles, paper, transparent regenerated cellulose sheet, and wood or wood products. It may be used to advantage in certain instances with rayon, linen, silk, or wool fabrics, or with textiles or other products prepared from cellulose derivatives such as cellulose acetate, cellulose nitrate, ethyl cellulose, methyl cellulose and the like.

The expression "regenerated cellulose sheeting in gel form" used in the examples has reference to a sheet of cellulose which has been regenerated in a manner well known in the art from a solution of cellulose xanthate (viscose), and washed and purified, but not dried. Regenerated cellulose may also be obtained in gel form from solutions of other suitable cellulose derivatives, such as cuprammonium solutions.

Cellulosic materials, with which the advantages of this invention are most apparent, have been discussed in detail. Other materials with which the present fire-retardant may be used include the following: proteins and their manufactures, such as films and filaments from casein, gelatin, zein, gliadin, edestin and the like; natural and synthetic resins such as rosin, ester gum, alkyd resins, polymeric esters of acrylic and methacrylic acid, vinyl resins, ether resins, and films and plastics made therefrom; natural and synthetic oils and films therefrom, such as linseed oil, linoxyn, and divinylacetylene polymer; rubber and synthetic rubbers; leather, silk, and wool; and any organic, non-volatile combustible substance whatever.

The present invention has an advantage over the more commonly used prior art flame-proofing agents for textile fabrics in the fact that the present fire retardant does not cause the harshness which normally characterizes fabrics treated with the prior art materials and in many instances has a softening effect of its own. As flame-proofing agents for regenerated cellulose film, the $P_2O_5$—$NH_3$ reaction product has the advantage over prior art materials in that even when present in the film in amounts up to about 15%, it does not crystallize out on the surface of the film under ordinary atmospheric conditions (25° C. and 50% relative humidity) as is characteristic of most prior art flame-proofing materials. Under favorable conditions the amount may be as high as 25% without crystallizing out. Furthermore the $P_2O_5$—$NH_3$ reaction product not only renders cellulose and its manufactures (film, thread, fabrics, caps bands, sponges, etc.) flameproof, but also imparts to these materials a certain degree of softness. Hence it may also be used either alone or in conjunction with glycerol, or other common softener, as a combined softening and flame-proofing agent. In the case of rayon, the $P_2O_5$—$NH_3$ product may be applied to the rayon thread or fabric. In the case of cellulose film, the phosphamide may be added with good results to the undried sheet or to the dried sheet before or after application of moistureproofing lacquers, such as those of Charch and Prindle (U. S. 1,737,187 and 1,826,696). The fact that the moistureproofing lacquer may contain highly inflammable substance does not seem to make any appreciable difference. The cellulose thread, fabric, or film which has been impregnated with the phosphamide may be stored for prolonged periods without deterioration by the phosphamide since the latter is substantially neutral.

The above description and examples are intended to be illustrative only. Any modification of or variation therefrom which conforms to the spirit of the invention is intended to be included within the scope of the claims.

I claim:

1. A product comprising a cellulosic material and, in sufficient amount to act as a fire retardant therefor, the reaction product of phosphorus pentoxide with anhydrous liquid ammonia.

2. A product comprising a fibrous cellulosic material and, in sufficient amount to act as a fire retardant therefor, the reaction product of phosphorus pentoxide with anhydrous liquid ammonia.

3. A product comprising paper and, in sufficient amount to act as a fire retardant therefor, the reaction product of phosphorous pentoxide with anhydrous liquid ammonia.

4. A product comprising a cellulosic textile material and, in sufficient amount to act as a fire retardant therefor, the reaction product of phosphorus pentoxide with anhydrous liquid ammonia.

5. A product comprising a cotton textile material and in sufficient amount to act as a fire retardant therefor, the reaction product of phosphorus pentoxide with anhydrous liquid ammonia.

6. A product comprising a non-fibrous cellulosic material and, in sufficient amount to act as a fire retardant therefor, the reaction product of phosphorus pentoxide with anhydrous liquid ammonia.

7. A product comprising sheet regenerated cellulose in gel form and, in sufficient amount to act as a fire retardant therefor, the reaction product of phosphorus pentoxide with anhydrous liquid ammonia.

8. A product comprising a cellulosic material and 5-15% by weight, based on the original weight of the cellulosic material, of the reaction product of phosphorus pentoxide with anhydrous liquid ammonia.

9. A product comprising a fibrous cellulosic material and 5-15% by weight, based on the original weight of the fibrous cellulosic material, of the reaction product of phosphorus pentoxide with anhydrous liquid ammonia.

10. A product comprising paper and 5-15% by weight, based on the original weight of the paper, of the reaction product of phosphorus pentoxide with anhydrous liquid ammonia.

11. A product comprising a cellulosic textile material and 5-15% by weight, based on the original weight of the cellulosic textile material, of the reaction product of phosphorus pentoxide with anhydrous liquid ammonia.

12. A product comprising a cotton textile material and 5-15% by weight, based on the original weight of the cotton textile material, of the reaction product of phosphorus pentoxide with anhydrous liquid ammonia.

13. A product comprising a non-fibrous cellulosic material and 5-15% by weight, based on the original weight of the non-fibrous cellulosic material, of the reaction product of phosphorus pentoxide with anhydrous liquid ammonia.

14. A product comprising sheet regenerated cellulose in gel form and 5-15% by weight, based on the original weight of the regenerated cellulose, of the reaction product of phosphorus pentoxide with anhydrous liquid ammonia.

MARTIN ELI CUPERY.

CERTIFICATE OF CORRECTION.

Patent No. 2,163,085.                                              June 20, 1939.

MARTIN ELI CUPERY.

It is hereby certified that error appears in the printed specification of the above numbered patent requiring correction as follows: Page 2, first column, line 34, Example IV, for the word "first" read fire; same page, second column, line 73, for "alkyld" read alkyd; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.